United States Patent [19]

Takehara

[11] Patent Number: 5,200,006

[45] Date of Patent: * Apr. 6, 1993

[54] PNEUMATIC TIRE WITH UNIFORM GROUND PRESSURE AT THE TREAD FACE

[75] Inventor: Kenji Takehara, Kobe, Japan

[73] Assignee: Sumitomo Rubber Industries, Ltd., Kobe, Japan

[*] Notice: The portion of the term of this patent subsequent to Jun. 5, 2007 has been disclaimed.

[21] Appl. No.: 362,019

[22] Filed: Jun. 6, 1989

[30] Foreign Application Priority Data

Jun. 7, 1988 [JP] Japan .................... 63-140704

[51] Int. Cl.$^5$ ................ B60C 3/04; B60C 9/18; B60C 9/20

[52] U.S. Cl. .................. 152/454; 152/531; 152/536; 152/538

[58] Field of Search ........... 152/526, 528, 529, 531, 152/536, 538, 533, 454

[56] References Cited

U.S. PATENT DOCUMENTS

| | | |
|---|---|---|
| 3,717,190 | 2/1973 | Boileau . |
| 4,258,775 | 3/1981 | Samoto . |
| 4,295,511 | 10/1981 | Mezzanotte et al. ........... 152/528 X |
| 4,442,879 | 4/1984 | Uemura . |
| 4,930,559 | 6/1990 | Takehara et al. .................. 152/531 |
| 5,000,239 | 3/1991 | Brayer et al. ................. 152/454 X |

FOREIGN PATENT DOCUMENTS

| | | |
|---|---|---|
| 0295898 | 12/1988 | European Pat. Off. . |
| 2428533 | 1/1980 | France ................... 152/528 |
| 2005201 | 4/1979 | United Kingdom . |

Primary Examiner—Michael W. Ball
Assistant Examiner—Adrienne C. Johnstone

[57] ABSTRACT

A pneumatic tire having a uniformed ground pressure distribution, in which the tire has an inner band divided into a pair of spaced apart parts composed of extensible organic fiber cords arranged substantially parallel to the equator and disposed between the carcass and the belt so as to substantially align each of the axially outer edges of the parts of the inner band with each of the outer edges of the belt ply having the largest axial width, and the tread face comprises an internal arc portion with a radius of curvature TR1 and an external arc portions with a radius of curvature TR2, wherein the TR2/TR1 ratio is in a range from 0.15 to 0.45 when the tire is mounted on a regular rim and inflated to 5% of the standard internal pressure, and the boundary point P of the internal arc portion and each external arc portion is located between the axially inner edge of each of the parts of inner band and the axially outward start point of the overlap area where at least two belt plies overlap in the axial direction of the tire.

1 Claim, 4 Drawing Sheets

PNEUMATIC TIRE WITH UNIFORM GROUND PRESSURE AT THE TREAD FACE

The present invention relates to a pneumatic tire, in which high speed durability and steering stability are improved and also wear resistance is upgraded by uniforming the distribution of ground pressure.

BACKGROUND OF THE INVENTION

Due to the spread of expressway network and the increase in running speed of cars, especially passenger cars, radial tires having a steel cord belt disposed radially outside the radial carcass have been widely used as tires suitable for high-speed running. In such a radial tire, however, when running at high speed, the centrifugal force accompanying the high speed rotation of tire sometimes lifts the belt to cause separation of the belt edges from the surrounding rubber. Especially when cut-end plies are used for the belt, the above-mentioned rubber separation is further promoted by poor adhesion between the cut-ends and the rubber.

In order to prevent the rubber separation at the edges of the belt ply to thereby improve high speed durability, as shown in FIG. 4 to 8, various means have been proposed. In FIG. 4, an a edge band B made of organic fiber cords is disposed on the upper surface of the edge portion of the belt A. In FIG. 5, two layers of the edge bands B are disposed. In FIG. 6, a full band C extending over the entire width of the belt A is disposed in addition to the edge band B. In FIG. 7, only the full band C extending over the entire width of the belt A is provided. In FIG. 8, two layer of the full bands C extending over the entire width of the belt A are disposed.

Considering the high speed durability, the tire shown in FIG. 5 having two layer of the edge bands B is superior to the one shown in FIG. 4 having a single layer of the edge band B. Furthermore, the tire shown in FIG. 6 having both the edge band B and full band C extending over the entire width is superior in the high speed durability to the one shown in FIG. 7 provided with a single layer of the full band C.

In the tire shown in FIG. 5 having two layers of the edge bands B, however, difference in stiffness tends to be generated between the tire crown and the tire shoulders, that is, the belt edge portions, and the difference causes uneven distribution of the ground pressure on the tread. As a result, the steering stability, particularly the steering stability at high speed is deteriorated and uneven wear tends to occur. In the tire shown in FIG. 8 using two layers of the full bands C covering the entire surface of the belt A, there is no difference in stiffness. In spite of the rigid steel cord belt A, the tread stiffness is decreased by the softer organic fiber full band C, and the steering stability at high speed is impaired. The tire shown in FIG. 7 has a similar problem.

Still furthermore, in the Japanese Patent Application KOKAI No. 58-61005, as shown in FIG. 9, an edge band D is disposed between the carcass and the belt A in addition to the edge band B disposed radially outside the belt A.

In this tire, however, the upper and lower edge bands B and D are inclined largely at 8 to 15 degrees in reverse directions with respect to the tire equator, and by such construction, tightness of the bands in the circumferential direction of the tire can not be obtained. Therefore, such edge bands can not work effectively as a tensile member.

On the other hand, a reduction in uneven wear and an improvement in wear resistance are required as tire characteristics together with the steering stability and the high speed durability as stated above. For that purpose, it is preferable to even out the distribution of the ground pressure at the tread face.

The above-mentioned edge bands, however, tend to make uneven the distribution of the ground pressure. The edge bands increase the stiffness of the tire shoulder portions, and accordingly the amount of inflation at the shoulder portions is relatively reduced in comparison with the crown portion. As a result, the ground pressure becomes high in the crown portion.

SUMMARY OF THE INVENTION

It is an object of the present invention to provide a pneumatic tire, in which by disposing an inner band having cords arranged substantially parallel to the tire equator between the belt and the carcass, the rubber separation at the belt edge is effectively prevented to enhance the high speed durability while keeping the steering stability at high speed, and in which the ground pressure distribution is unified to improve the wear resistance by setting the ratio of radii of curvature at the tread crown portion and the tread shoulder portions when the tire is inflated to 5% of the standard pressure, in a specified range.

According to one aspect of the present invention, a pneumatic tire has a tread portion, a pair of sidewall portions extending radially inwardly one from each edge of the tread portion, and a bead portion located at the radially inner end of each sidewall portion and having a bead core extending therethrough. Further, the tire comprises a toroidal carcass turned up around the bead cores to secure both edges thereof to the bead cores, a belt composed of plural plies of steel cords disposed radially outside the carcass, and an inner band composed of extensible organic fiber cords arranged substantially parallel to the tire equator and disposed between the carcass and the belt so as to substantially align the axially outer edge of the inner band and the outer edge of the belt ply having the largest width, wherein the tread portion is provided with a tread face comprising an internal arc portion with a radius of curvature TR1 defining a tread crown and external arc portions with a radius of curvature TR2 defining tread shoulders, the ratio TR2/TR1 of the radius of curvature TR2 to the radius of curvature TR1 being in a range from 0.15 to 0.45 when the tire is mounted on a regular rim and inflated to 5% of the standard internal pressure, the boundary point P of the internal arc portion and each external arc portion is located between the axially inner edge of the inner band and the axially outward start point of the overlap area where at least two belt plies overlap in the axial direction of the tire.

BRIEF DESCRIPTION OF THE DRAWINGS

An embodiment of the present invention will now be described referring to the drawings, in which:

In FIG. 1, a pneumatic tire 1 has a tread portion T, sidewall portions S extending radially inwardly one from each tread edge, and bead portions B located on the radially inward ends of the sidewall portions. The and the tire is provided with a carcass 3 turned up around bead cores 2 from inside to outside of the tire to be secured thereto, and a belt 4 disposed radially outside the carcass 3, and further a band 7 comprising, in this embodiment, an inner band 5 located between the carcass 3 and the belt 4, and an outer band 6 disposed radially outside the belt 4, each of inner band 5 and outer band 6 being divided into a pair of axially spaced apart parts disposed on opposite sides of the tire equator, each part of both inner band 5 and outer band 6 having an axially inner edge and an axially outer edge.

Figure 1:
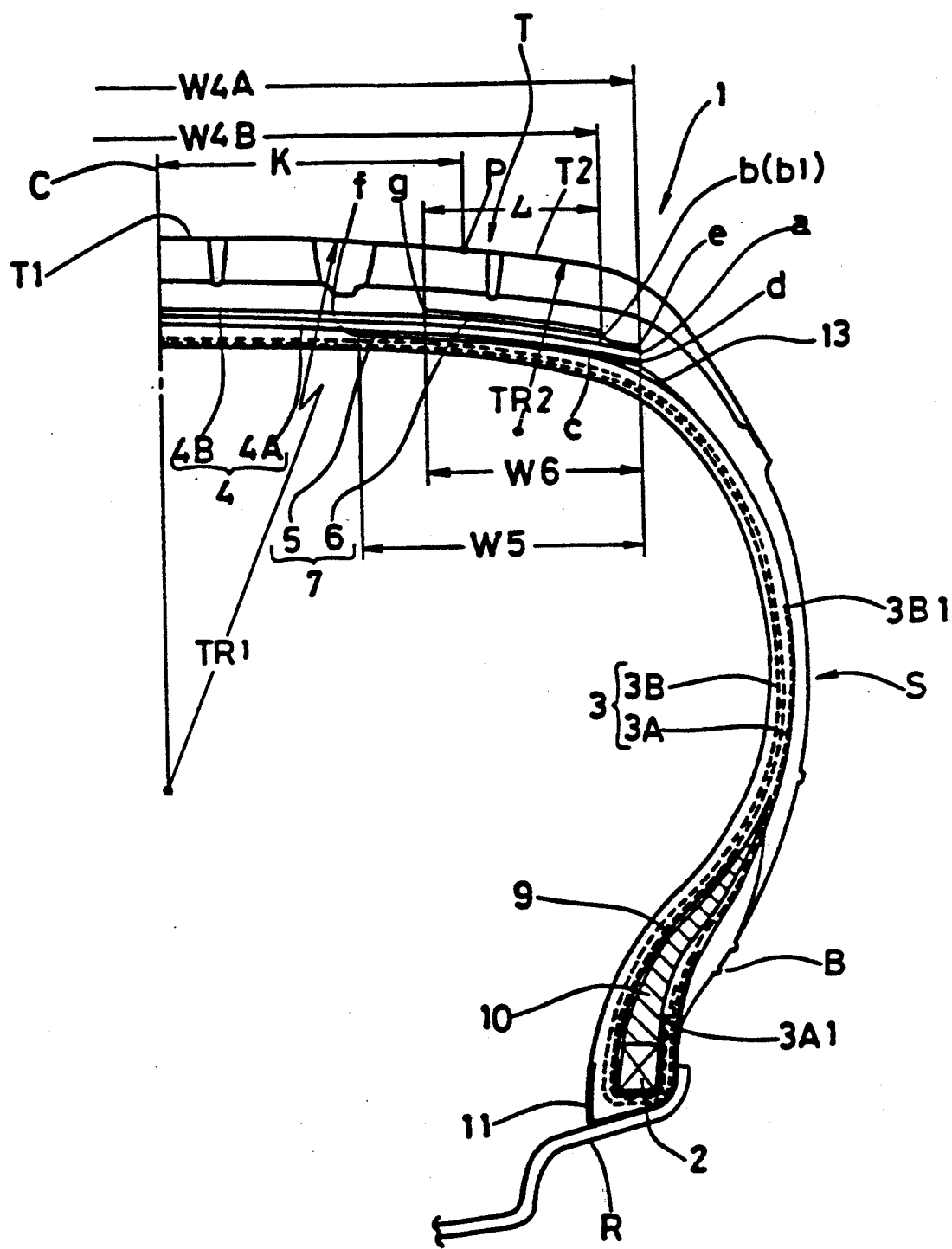
FIG. 1 is a sectional view showing an embodiment of the present invention.

The carcass 3 comprises two plies 3A and 3B turned up around the bead cores 2. The end 3A1 of the axially inner turned up portion is terminated near and above the bead core 2, and the end 3B1 of the axially outer turned up portion extends to near the largest width point of the tire.

The carcass 3 has a radial structure in which the carcass cords are arranged at 60 to 90 degrees to the tire equator C. For the carcass cords, steel cord and, organic fiber cords, such as nylon, rayon, polyester and the like, can be used.

Each bead portion is provided with a rubber bead apex 10 to increase the lateral stiffness. The bead apex is disposed between the turned up portion and main portion of the carcass 3, and extended taperingly radially outwardly from the bead core 2.

Furthermore, in each bead portion B, a reinforcing layer 9 is disposed between the carcass and the bead core, the reinforcing layer 9 extending radially outwardly along the main portion and turned up portion of the carcass, whereby the reinforcing layer 9 not only prevents the abrasion between the bead core and the carcass cords which moves therearound accompanying the deformations of the tire, but also raises the bead stiffness.

Still furthermore, each bead portion B is provided with a rim chafer 11 extending along the outside of the bead to prevent wear by the rim.

In this embodiment, the above-mentioned belt 4 comprises two plies 4A and 4B. The width W4A of the inner belt ply 4A on the carcass 3 side is set to be 1.01 to 1.20 times the width W4B of the outer belt ply 4B. This prevents the abrupt change in stiffness which will be caused when the axially outer edges a and b of the belt plies 4A and 4B coincide with each other in the axial direction. Accordingly in this embodiment, the belt plies 4A and 4B overlap between the edges b, and the edge b becomes the start point b1 of the above-mentioned overlap region on the shoulder side.

The belt plies 4A, 4B are made of steel cords, and the steel cords are arranged at about 10 to 30 degrees to the tire equator so that the inner and outer belt plies 4A, 4B incline in opposite directions with respect to the tire equator, thereby improving the uniformity of the tire.

Meanwhile, it may be possible to form the outer belt ply 4B wider than the inner belt ply 4A.

The inner belt ply 4A contacts with the carcass axially inside a point c and is separated axially outside the point c, and in the separating part, a breaker cushion 13 is inserted locating at the edge portion of the belt 4. The breaker cushion is made of soft rubber in a triangular cross sectional shape extending axially outwardly from the separating part along the carcass.

The inner band 5 is mounted so that the axially outer edge d of each part thereof substantially coincides with one of the outer edges a of the widest belt ply, the inner belt ply 4A in this case. Here, the expression of "substantially coincides with" means the state that the outer edge d of each part of the inner band 5 is not disposed axially inside the adjacent edge a of the belt ply 4A, but just coincides with the outer edge a or projects outward from the outer edge a in a range not exceeding 8 mm, more preferably 5 mm. The parts of the inner band 5 contact with the radially inside surface of the inner belt ply 4A, whereby its the end of each part is pinched between the belt ply 4A and the breaker cushion 13.

The axial width W5 of each part of the inner band 5 is set in a range of 15 to 40% of the widest width W4 of the belt 4, or the width W4A of the inner belt ply 4A in this embodiment.

The outer band 6 has the axially outer edge e of each part substantially coinciding with one of the outer edges d of the parts of inner band 5, and the parts of the outer band 6 cover both outer surface of the edge portions of the outer belt ply 4B.

The axial width W6 of each part of outer band 6 is set to be in a range of 15 to 40% of the width W4A of the inner belt ply W4A, and equal to or shorter than the width W5 of the corresponding part of the inner band 5.

The inner band 5 and the outer band 6 are composed of organic fiber cords, and comparatively high extensible fibers such as nylon, polyester and rayon are used for the organic fiber material. This makes it possible to follow the extension and compression of the belt 4 when the tire is deformed, and to prevent the separation between the band and the belt 4.

The band cords are arranged substantially parallel to the tire equator C at 0 to 4 degrees, more preferably 0 to 2 degrees with respect to the tire equator C.

Figure 2:
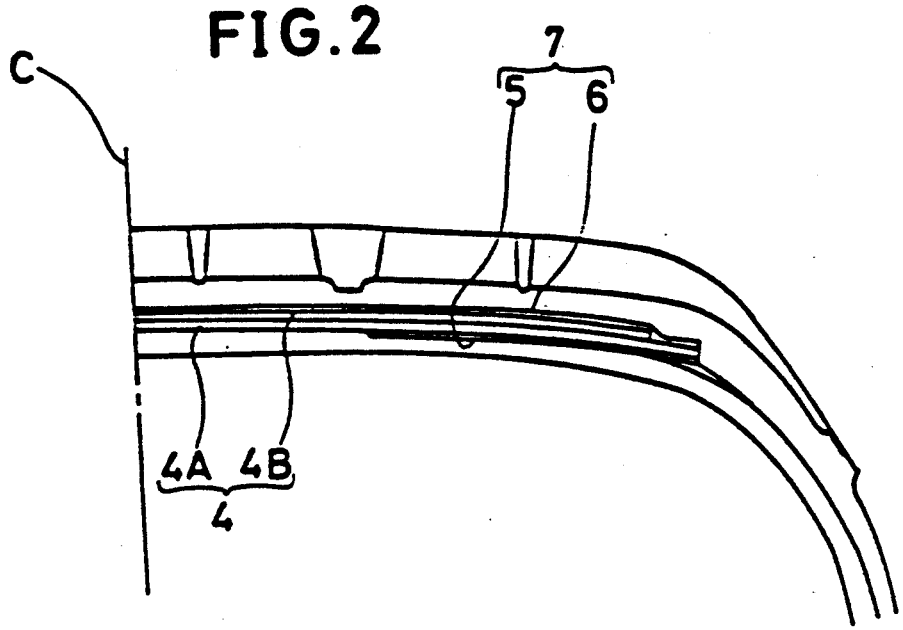
FIGS. 2 and 3 are sectional views each showing another embodiment of the invention.
Figure 3:
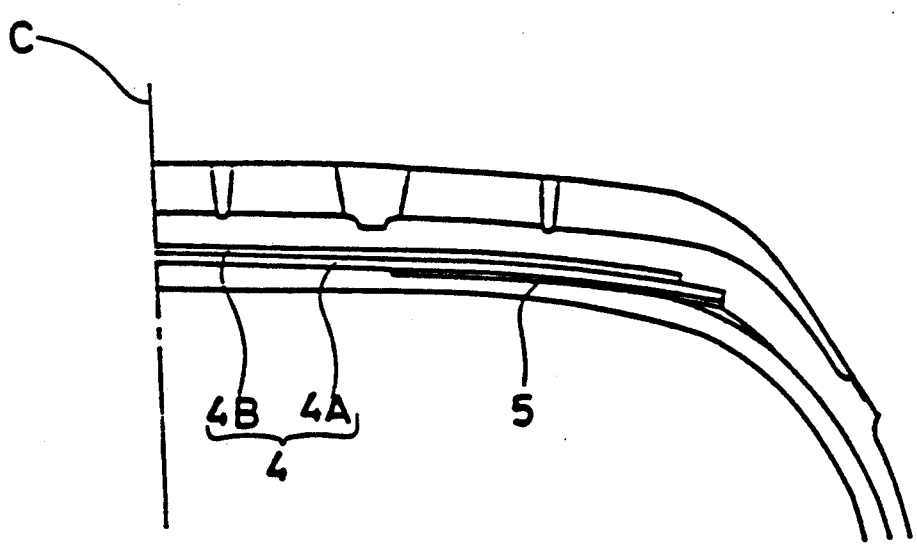

The outer band 6 can be formed so as to cover the entire surface of the belt as shown in FIG. 2. The outer band 6 may be eliminated as shown in FIG. 3.

As described above, the pneumatic tire 1 is provided between the carcass 3 and the belt 4 with the inner band 5 which is inclined at a small angle to the tire equator and which is formed by using extensible band cords made of organic fibers, As a consequence, the tension acting on the carcass 3 can be transmitted smoothly to the belt 4 through the inner band 5, which increases the tension of the belt 4. As a result, the stiffness at the shoulder is effectively increased, which contributes to the improvement in the steering stability of the tire. Besides, by providing the inner band 5 axially inside the belt 4, the stress concentration on the belt edge generated according to the tire rotation can be released, and the rubber separation can be prevented. Further, by the fact that the outer edge d of each part of the inner band 5 substantially coincides with the adjacent outer edge a of the inner belt ply 4A, the stress concentration on the edge d is reduced, and this helps to prevent the separation. Therefore, the durability of the tire at high speed can be improved.

By disposing the edge portion of each part of the inner band 5 between the belt 4 and the breaker cushion 13, the buffer effect of the inner band 5 is improved also by means of the breaker cushion 13, and the effect to prevent the separation can be significantly increased.

Figure 5:
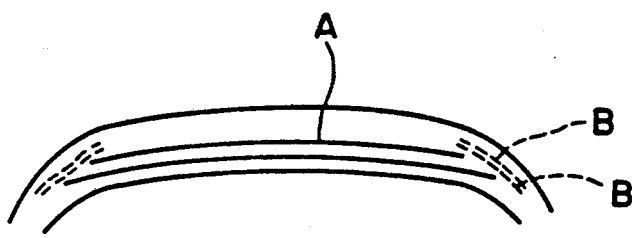
Figure 6:
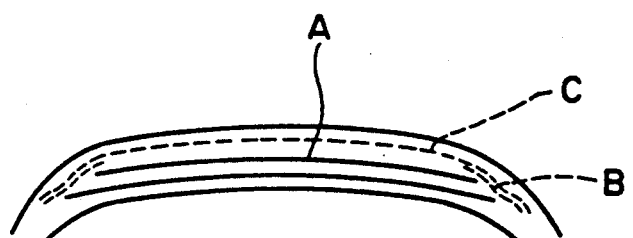
Figure 7:
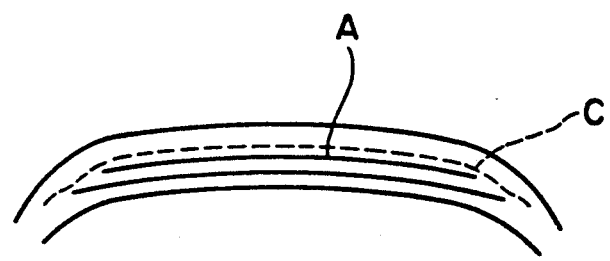

The part of the outer band 6 covering the edge of the belt 4 as shown in FIG. 1, together with the inner band 5, can reduce the difference in stiffness which is generated between the belt edge portion and the crown portion when a plurality of edge bands B are used as shown in FIG. 5, which enables not only to even the ground pressure distribution but also to upgrade the steering stability at high speed, and further enables the even distribution of wear.

Figure 8:
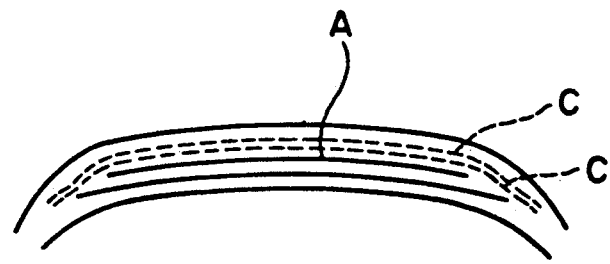
Figure 9:
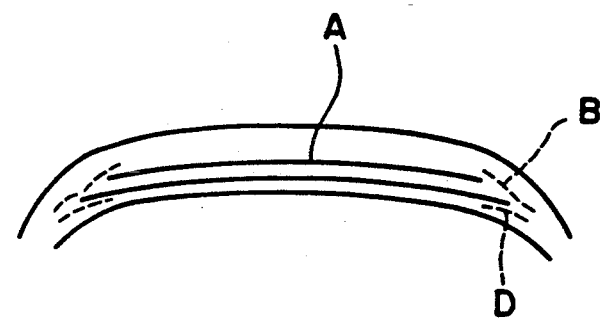

When the outer band 6 covers the entire width of the belt 4 as shown in FIG. 2, the rubber separation at the belt edge can be prevented in cooperation with the inner band 5, and different from the case shown in FIG. 8 as mounting two bands C, the stiffness of the belt 4 can be transmitted to the tread, and the stiffness of the tread can be from decreasing, and therefore the steering stability at high speed can be maintained.

The width W5 of each part of the inner band 5 is set in a range of 15 to 40% of the width W4 of the widest belt ply 4A. When the outer band 6 is used, the width W6 thereof of each part of outer band 6 is preferably set in the same range but shorter than the width W5 of each part of the inner band 5. If the width W5 of the part of the inner band is 5 is less than 15%, the effect to prevent the belt edge separation becomes poor. The width of more than 40% is needless from the viewpoint of the separation preventing function, and it is preferably retain a region where the belt 4 directly contacts with the carcass 3 to transmit the tension of the carcass 3 to the belt 4.

Moreover, when the width W6 of the outer band 6 is less than 15% the preventing function is insufficient in the same way. And it is unnecessary in the same way to form the width so as to exceed 40%.

The reason why the width W6 of each part of the outer band 6 is set shorter than the width W5 of each part of the inner band 5 is to prevent the generation of an abrupt change in the stiffness caused by the coincidence of the inner edges f and g in the widthwise direction of each part of the inner band 5 and the outer band 6, respectively. It is also clarified from the viewpoint of the prevention of separation from rubber that the function can be exerted if each part of the outer band 6 is formed narrower. It is also possible to form the outer band 6 wider as shown in FIG. 2.

The tire 1 is mounted on a regular rim R for the tire and inflated to 5% of the standard pressure specified on the tire, that is, 5% pressure. Under this condition, the tread face is composed of an internal arc portion T1 forming the tread crown, and external arc portions T2 forming the tread shoulders. The internal arc portion T1 is provided with a curvature of radius TR1 having the center on the tire equator C. The external arc portions T2 are provided with a curvature of radius TR2. The ratio TR2/TR1 is set to be in a range from 0.15 to 0.45, more preferably from 0.20 to 0.35 when inflated to 5% pressure.

By each part of the inner band 5 at one of the belt edge portions the stiffness at the shoulder part is increased, and the amount of the swelling at the shoulder part, that is, the outward movement of the external arc portion T2 by tire inflation is decreased. Accordingly, the amount of the swelling at the crown part, that is, the internal arc portion T1 becomes relatively large. As the result, the radius of curvature TR1 at this part is reduced, and the ground pressure distribution of the tread tends to be uneven. In order to prevent such a phenomenon, by setting the ratio TR2/TR1 of the radii at 5% pressure in the above range to set the radius of curvature TR1 of the internal arc portion T1 larger than the radius of curvature TR2 of the external arc portion T2 within the limit of the above range, the tread profile is kept optimum when inflated, and the ground pressure distribution is evened. This works effectively in low aspect ratio tires having a very low aspect ratio.

The boundary points P between the internal arc portion T1 and the external arc portions T2 are each located in such a range L as extending axially outward of the axially inward edge f of each part of the inner band 5, and axially inward of the axially outward start point b1 of the overlap region where the belt plies 4A and 4B overlap, and K is the distance from the tire equator C. The start point b1 indicate the position where at least two belt plies start overlapping, even if the belt 4 is composed of three or more belt plies.

By designing in this way, the point P as an inflexion point is located in the range L where the stiffness is relatively high, and as a result, the excessive change of curvature at the point P can be prevented, thereby smoothing the tread profile and becoming helpful for the evenness of the ground pressure.

Tires of 195/60R14 size having the structures shown in FIG. 1 and 3 were experimentally manufactured as Working Example tires 1 to 6 according to the sizes and specifications given in Table 1. Tires shown in Table 2 as References 1 to 10 were also produced. Then, their high speed durability, steerability at high speed and wear resistance were compared. Furthermore, the shape of the ground contacting region was measured. Here, the steel belt ply in each tire was inclined at an angle of 19 degrees.

The data of the durability test obtained by the step speed test by ECE 30 are shown in Tables 1 to 2. The Examples 1 to 6 were superior to References 8 to 10 using no inner band. The Reference 7 in which aromatic polyamide cords were used for the band was broken at a low speed.

Each tire was mounted on a 1500 cc front wheel drive passenger car, and the steerability was measured by feeling test. The obtained data were evaluated in three ranks. The test was executed while driving zigzag on a flat road surface at a speed of 80 Km/h.

The wearing status was examined by field car tests.

On the wearing status, the uniformity of wearing was checked, and all the tires were evaluated in ten ranks after driving 3000 km at a rated load. Larger scores indicate the superior state in wear resistance.

Figure 10:
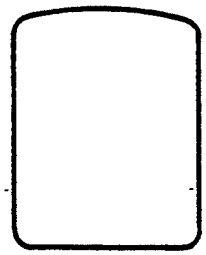
FIGS. 10 to 12 are diagrams showing the shape of ground contacting region.
Figure 11:
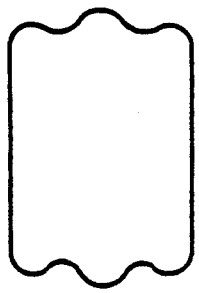
Figure 12:
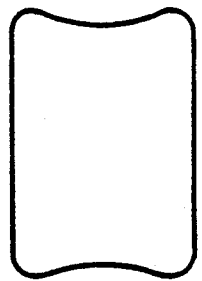

The Example tires had less uneven wear in comparison with the reference tires, and they were worn evenly. It is considered that such preferable data could be obtained in the Example tires on the basis of the superior shape of the ground contacting region and uniform distribution of the ground pressure as shown schematically in FIG. 10 (for Example 3), FIG. 11 (for Reference 7) and FIG. 12 (for Reference 8).

TABLE 1

| Structure | Ex. 1 FIG. 1 | Ex. 2 FIG. 1 | Ex. 3 FIG. 1 | Ex. 4 FIG. 3 | Ex. 5 FIG. 3 | Ex. 6 FIG. 3 |
| --- | --- | --- | --- | --- | --- | --- |
| Inner band cord | | | | | | |
| Material | Nylon 6.6 | Nylon 6.6 | Polyester | Nylon 6.6 | Nylon 6.6 | Polyester |
| Thickness | 840 d/2 | 1260 d/2 | 1000 d/2 | 840 d/2 | 1260 d/2 | 1000 d/2 |
| Inclination (deg) | 0 | 0 | 0 | 0 | 0 | 0 |

TABLE 1-continued

| Structure | Ex. 1 FIG. 1 | Ex. 2 FIG. 1 | Ex. 3 FIG. 1 | Ex. 4 FIG. 3 | Ex. 5 FIG. 3 | Ex. 6 FIG. 3 |
| --- | --- | --- | --- | --- | --- | --- |
| Outer band cord | | | | | | |
| Material | Nylon 6.6 | Nylon 6.6 | Polyester | | | |
| Thickness | 840 d/2 | 1260 d/2 | 1000 d/2 | | | |
| Inclination (deg) | 0 | 0 | 0 | | | |
| Radius TR1 (mm) | 860 | 860 | 860 | 820 | 820 | 820 |
| Radius TR2 (mm) | 185 | 185 | 185 | 230 | 230 | 230 |
| Ratio TR2/TR1 | 0.215 | 0.215 | 0.215 | 0.280 | 0.280 | 0.280 |
| Distance K of boundary point (mm) | 45 | 45 | 45 | 32 | 32 | 32 |
| High speed durability ECE 30 (km/h) | 230 | 250 | 250 | 220 | 240 | 230 |
| High speed steering stability | 4 | 4 | 4 | 4.5 | 4.5 | 4.5 |
| Wear evenness | 10 | 9 | 9 | 10 | 9 | 9 |

TABLE 2

Figure 4:
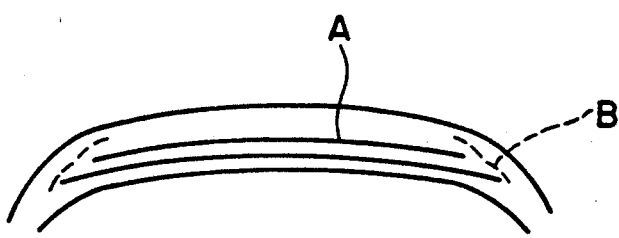
FIGS. 4 to 9 are diagrams showing examples according to prior art.

| Structure | Ref. 1 FIG. 1 | Ref. 2 FIG. 1 | Ref. 3 FIG. 1 | Ref. 4 FIG. 3 | Ref. 5 FIG. 3 | Ref. 6 FIG. 3 | Ref. 7 FIG. 1 | Ref. 8 FIG. 4 | Ref. 9 FIG. 5 | Ref. 10 FIG. 8 |
| --- | --- | --- | --- | --- | --- | --- | --- | --- | --- | --- |
| Inner band cord | | | | | | | | | | |
| Material | Nylon 6.6 | Nylon 6.6 | Polyester | Nylon 6.6 | Nylon 6.6 | Polyester | Note 1 | | | |
| Thickness | 840 d/2 | 1260 d/2 | 1000 d/2 | 840 d/2 | 1260 d/2 | 1000 d/2 | 1500 d/2 | | | |
| Inclination (deg) | 0 | 0 | 0 | 0 | 0 | 0 | 0 | | | |
| Outer band cord | | | | | | | | | | |
| Material | Nylon 6.6 | Nylon 6.6 | Polyester | | | | Note 1 | Nylon 6.6 | Nylon 6.6 | Nylon 6.6 |
| Thickness | 840 d/2 | 1260 d/2 | 1000 d/2 | | | | 1500 d/2 | 840 d/2 | 840 d/2 | 840 d/2 |
| Inclination (deg) | 0 | 0 | 0 | | | | 0 | 0 | 0 | 0 |
| Radius TR1 (mm) | 450 | 450 | 450 | 450 | 450 | 450 | 450 | 450 | 450 | 450 |
| Radius TR2 (mm) | 450 | 450 | 450 | 450 | 450 | 450 | 450 | 450 | 450 | 450 |
| Ratio TR2/TR1 | 1.0 | 1.0 | 1.0 | 1.0 | 1.0 | 1.0 | 1.0 | 1.0 | 1.0 | 1.0 |
| Distance K of boundary point (mm) | | | | | | | | | | |
| High speed durability ECE 30 (km/h) | 230 | 250 | 250 | 220 | 240 | 230 | 210 Note 2 | 220 | 240 | 240 |
| High speed steering stability | 3.5 | 3.5 | 3.5 | 4 | 4 | 4 | 2.5 | 3.5 | 3 | 3 |
| Wear evenness | 7 | 6 | 6 | 8 | 7 | 7 | 5 | 7 | 6 | 8 |

Note 1 Aromatic polyamide fiber (aramid) was used.
Note 2 The stiffness was so large that the crown part was broken.

As described above, in the pneumatic tire of this invention, the inner band composed of extensible organic fiber cords is disposed between the carcass and the belt, and the band cords are laid substantially parallel to the tire equator, whereby the separation of the belt edge form the surrounding rubber can be effectively prevented while keeping or improving the steering stability at high speed, and also the high speed durability can be improved.

In addition, since both the ratio of radii of curvature of the internal and external arc portions of the tread face and the position of the boundary points are set in the appropriate ranges, respectively, the ground pressure distribution can be made even, thereby preventing the tread from uneven wear.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pneumatic tire comprising
   a tread portion, the tread portion having a pair of tread edges,
   a pair of sidewall portions extending radially inwardly, one sidewall portion from each tread edge,
   a bead portion located at the radially inner end of each said sidewall portion and having a bead core extending therethrough,
   a toroidal carcass, the carcass having a pair of carcass edges, each said carcass edge being turned up around each said bead core to secure both said carcass edges to said bead cores,
   a belt composed of plural plies of steel cords disposed radially outside the carcass, one of said plural plies being a widest ply with a pair of outer edges, and
   an inner band, said inner band being disposed between said carcass and said belt and being divided into a pair of axially spaced apart parts, each of said parts having an axially inner edge and an axially outer edge, said inner band being composed of extensible organic fiber cords arranged substantially parallel to the tire equator and disposed between the carcass and the belt so as to substantially align the axially outer edge of each said part of said inner band and one of the outer edges of the widest ply,
   an outer band, said outer band being disposed radially outwardly of the belt, composed of extensible organic fiber cords arranged substantially parallel to the tire equator, and being divided into a pair of axially spaced apart parts, each of said parts of said outer band having an axially inner end and an axially outer end, each of said parts of said outer band having a width not larger than the width of each said part of the inner band, the tread portion provided with a tread face comprising an internal arc portion with a radius of curvature TR1 defining a tread crown and a pair of external arc portions, each of said pair of external arc portions having a radius of curvature TR2 defining a tread shoulder axially outward from the tread crown, the ratio TR2/TR1 of the radius of curvature TR2 to the radius of curvature TR1 being in a range from 0/15 to 0.45 when the tire is mounted on a regular rim and inflated to 5% of the standard internal pressure, one of a pair of boundary points P being disposed between the internal arc portion and each of the external arc portions and being located between the axially inner edge of one said part of said inner band and the axially outward start point of an overlap area where the widest two said plies overlap in the axial direction of the tire.

* * * * *